United States Patent [19]

Grant et al.

[11] Patent Number: 5,324,433

[45] Date of Patent: Jun. 28, 1994

[54] IN-SITU RESTORATION OF CONTAMINATED SOILS AND GROUNDWATER

[75] Inventors: David C. Grant, Gibsonia; Edward J. Lahoda, Edgewood Borough, both of Pa.

[73] Assignee: Westinghouse Electric Corp., Pittsburgh, Pa.

[21] Appl. No.: 870,444

[22] Filed: Apr. 16, 1992

[51] Int. Cl.$^5$ .............................................. B01D 11/04
[52] U.S. Cl. ..................................... 210/634; 210/747
[58] Field of Search ............... 210/751, 634, 724, 726, 210/912, 913, 611, 747, 766, 763

[56] References Cited

U.S. PATENT DOCUMENTS

| | | | |
|---|---|---|---|
| 3,950,179 | 4/1976 | Schneider | 106/208 |
| 4,156,658 | 5/1979 | Mercer, Jr. et al. | 252/301.1 W |
| 4,336,142 | 6/1982 | Bye | 210/724 |
| 4,354,942 | 10/1982 | Kaczur et al. | 210/712 |
| 4,418,961 | 12/1983 | Strom et al. | 299/5 |
| 4,615,643 | 10/1986 | Gouvenot | 405/128 |
| 4,857,203 | 8/1989 | Pope et al. | 210/912 X |
| 4,888,053 | 12/1989 | Grayson et al. | 75/101 R |
| 4,909,849 | 3/1990 | Funderburk | 106/90 |
| 4,950,409 | 8/1990 | Stanforth | 210/751 |
| 4,981,394 | 1/1991 | McLaren et al. | 405/129 |
| 4,997,313 | 3/1991 | Gibson et al. | 405/128 |
| 5,013,453 | 5/1991 | Walker | 210/712 |

OTHER PUBLICATIONS

Handbook on In Situ Treatment of Hazardous Waste Contaminated Soils, EPA/540/2-90/002, Jan. 1990, pp. 7–31.

*Primary Examiner*—Frank Spear
*Attorney, Agent, or Firm*—Lynn B. Morreale

[57] ABSTRACT

A method for removing and stabilizing in-situ soluble heavy metal contaminants in land formations which comprises introducing into said formation an aqueous remediation solution comprising naturally-occurring ions present in said formation and remediation ions. The remediation solution selectively solubilizes and mobilizes the heavy metal contaminants into solution while substantially suppressing the displacement of said naturally-occurring ions from said formation. The method is effective with heavy metals which exist in both anionic and cationic form, and may be used to treat land formations below the surface to reduce soluble heavy metal contamination to a few parts per billion.

10 Claims, No Drawings

IN-SITU RESTORATION OF CONTAMINATED SOILS AND GROUNDWATER

CROSS REFERENCE TO RELATED APPLICATION

The invention described herein is related to copending application Ser. No. 870,439 filed concurrently herewith, entitled "In-Situ Restoration of Contaminated Soils and Groundwater" by Grant et al. and assigned to the assignee of the present application, now U.S. Pat. No. 5,275,739.

BACKGROUND OF THE INVENTION

This invention relates generally to methods of restoring contaminated soils and groundwater in-situ and, more particularly, to methods for removing and stabilizing soluble heavy metal contaminants in land formations to prevent the leaching and remobilization of those heavy metal contaminants by groundwater.

There is increasing concern over the hazards posed by the rising levels of heavy metals within the world's water supplies and land formations due to accidental spills, leaks, mining practices and poor disposal practices. Most heavy metals are toxic to some degree to all life-forms and can have a deleterious effect on aquatic flora and fauna. In humans, toxic heavy metal poisoning can lead to severe nervous system disorders and can cause death.

Accordingly, numerous methods have been proposed for the removal of heavy metal contamination from land and submarine formations. However, the application of such methods frequently is problematic, especially when applied in-situ to land and submarine formations several hundred feet underground. In addition, such methods typically fail to successfully treat both land and groundwater formations. As a result, even after treatment, significant amounts of mobile contaminants remain in the soil.

For example, it has been suggested that contaminated soil and water can be removed from its location and subsequently treated offsite. However, such methods are not only extremely costly and time consuming, they present added dangers associated with the transportation of such hazardous materials. In addition, it may not be feasible or practical from a cost standpoint to remove an entire contaminated area for treatment. Thus, significant amounts of contamination may remain even after application of such treatment methods.

Alternatively, it has been suggested that heavy-metal-containing-soils can be treated in-situ by various precipitation techniques. For example, in U.S. Pat. No. 4,354,942, issued to Kaczur et al., a method for the in-situ removal of soluble mercury from land and water areas using sulfur compounds is described. However, the use of sulfur compounds presents potential safety and health problems, and additional environmental risks.

In U.S. Pat. No. 4,418,961, issued to Strom et al., there is disclosed an in-situ method for restoring soluble heavy metal contaminants in subterranean formations that have been subjected to uranium mining. Strom et al. teach to add restoration fluid containing small amounts of $CO_2$ to a mining site containing calcium carbonate in order to induce precipitation of calcium with the heavy metal ions, thereby stabilizing them. However, Strom's method is limited to the removal of metal anions. Moreover, this method essentially stabilizes only those contaminants which are already mobilized and does not treat solidified contaminants in the soil. Accordingly, these contaminants will eventually leach into the ground water, thus re-contaminating it after treatment.

Similarly, in U.S. Pat. No. 4,336,142, issued to Bye, there is disclosed a method for removal of heavy metals in land fills, contaminated soils and sewage sludge using gamma dicalcium silicate as a precipitant. As with Strom, this method will tend to stabilize only those contaminants which are already mobilized; therefore, substantial amounts of contamination will remain in the soil. In addition, if a substantial amount of soluble contamination is present in the land formation prior to treatment, it may be too costly and even impossible to achieve environmentally acceptable levels of heavy metals using this method.

It has further been suggested that heavy metals situated in soil can be removed using flushing techniques, wherein a site is flooded with an appropriate washing solution, the contaminants are mobilized into the flushing solution by way of solubilization, the solution is subsequently collected, removed and treated. However, flushing methods that are presently used require extremely long treatment times and large volumes of solution, thus resulting in high treatment costs. Moreover, even though significant amounts of the contaminants can be solubilized and removed, a potential exists for incomplete removal of contaminants due to heterogeneity of soil permeability. Accordingly, further contaminants from the soil can re-equilibrate with fresh ground water, resulting in continuous re-contamination of the ground water.

SUMMARY OF THE INVENTION

The present invention is directed to methods for removing and stabilizing in-situ soluble heavy metal contaminants in land and ground water. The method of the invention comprises introducing into a land formation an aqueous remediation solution, wherein the remediation solution contains effective amounts of remediation ions and ions that are naturally present in the land formation. The method of the present invention selectively targets harmful, heavy metal ions for solubilization, mobilization and removal from the soil.

Generally, heavy metal contaminants are retained in the formation by exchanging onto the charged clay fraction of soil. As groundwater comes into contact with the soil, the contaminants may further exchange with ions that are present in the groundwater. Typically, the heavy metal contaminants are multivalent cations which do not readily exchange with the ions in the groundwater, but do so at sufficiently high levels to be an environmental problem. To effectively remediate the groundwater, it is thus necessary to stabilize or remove the contaminants from the soil.

The most preferred alternative is to remove the contamination from the formation altogether. In order to accomplish this, a solution is injected into the formation which results in the exchange of the contaminant from the soil into the solution. Although many salt solutions could theoretically accomplish this, many such solutions also displace harmless naturally-occurring ions and accordingly, are not effective in removing undesirable heavy metal contaminants. In fact, many naturally-occurring cations, (e.g., sodium, calcium, potassium and magnesium) are typically held less tightly than multivalent cation contaminants and would thus be the first removed. Unless the remediation solution can target the contaminants, the removal process can be long and costly. The invention presented here involves applying a solution in-situ which targets the removal of heavy metals, including radioactive species, which have contaminated the soil and groundwater, leaving the harmless, naturally-occurring ions behind in the soil.

More specifically, in practicing the method of the invention, a remediation solution is introduced into the formation which comprises an effective amount of any nonhazardous ion that is naturally present in the land formation being treated. Due to the introduction of an effective amount of such naturally-occurring ions into the formation, the displacement and exchange of these harmless ions held by the soil with the remediation ions in solution is substantially suppressed. Accordingly, the remediation ions remain free to displace and exchange with the soluble heavy metal ions.

Therefore, upon introduction of the remediation solution, the heavy metal contaminants readily solubilize and equilibrate with the remediation ions in solution. Thus, the heavy metal contaminants are mobilized, and when the remediation solution is subsequently recovered from the formation, the solubilized heavy metal contaminants contained therein are removed.

In a preferred embodiment of the invention, the land formation is subsequently treated with another solution containing a stabilizing amount of silicate ions. Any heavy metal contaminants remaining in the formation, when subjected to silicate ions, will form coprecipitates which are substantially insoluble in formation fluids. Thus, the coprecipitation reaction acts as a scavenger for any heavy metal ions that successfully resist removal.

The method of the invention is effective at removing and stabilizing a wide variety of soluble heavy metals which can be eluted or leached out of land formations by rainfall or ground water, and which can subsequently enter public or private water supplies, thus posing significant danger to the environment. Furthermore, the stabilized heavy metal contaminants are not remobilized when fresh groundwater comes into contact with the restored (i.e., treated) soil.

Accordingly, it is an object of this invention to provide a method for the in-situ removal and stabilization of soluble heavy metal contaminants in land and ground water which minimizes the potential for re-contamination of the groundwater by contaminants remaining in the soil, and further, which can be utilized without posing safety and health problems to workers, and without harmful impact to the environment.

It is a further object of this invention to provide a method for the in-situ removal and stabilization of soluble heavy metal contaminants in land and ground water which is inexpensive to apply, and is fast, efficient and highly effective in reducing the level of contaminates to environmentally acceptable levels.

DETAILED DESCRIPTION OF THE INVENTION

In the method of the invention, an aqueous remediation solution comprising an effective amount of remediation ions is introduced into a land formation containing heavy metal contaminants. The remediation solution also comprises an effective amount of any nonhazardous ion that is naturally present in the formation.

The remediation solution of the invention selectively solubilizes and mobilizes the contaminants while simultaneously minimizing the displacement of naturally-occurring, non-hazardous ions. This is accomplished by using a remediation solution which contains naturally-occurring ions at a concentration that is at least about equal to that found in groundwater in the formation. The advantage of this approach can be seen by examining the equilibrium ion exchange reactions between the contaminated soil and the remediation solution. The exchange of the remediation solution ions with the ions in the contaminated soil is represented by the following reactions:

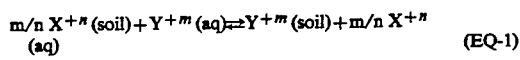
(EQ-1)

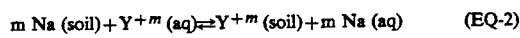  (EQ-2)

where X represents a contaminant having valance n; Y represents a remediation ion having valance m; and Na is representative of a naturally-occurring ion.

These exchange reactions are governed by the following equilibriums:

$$K1_{eq}=[Y \text{ (soil)}] [X \text{ (aq)}]^{m/n} /[X \text{ (soil)}]^{m/n}[Y \text{ (aq)}] \quad \text{(EQ-3)}$$

$$K2_{eq}=[Y \text{ (soil)}] [Na \text{ (aq)}]^{m} /[Na \text{ (soil)}]^{m}[Y \text{ (aq)}] \quad \text{(EQ-4)}$$

where $K1_{eq}$ and $K2_{eq}$ are the equilibrium constants.

As shown in Equations (1) and (2), the remediation ion can exchange for either the contaminant ion or the naturally-occurring ions. Typically, the naturally-occurring ions are more readily exchangeable, that is, $K2_{eq} > K1_{eq}$, and thus the remediation ion will displace the naturally-occurring ions first. Referring to Equation (4), it is possible to minimize this exchange by placing these naturally-occurring ions in the remediation solution. That is, by having sufficiently high levels of natural-occurring-ions (for example (Na (aq))) in the remediation solution, the exchange of the remediation ions for these naturally-occurring ions also present in the soil (Na (soil)) will be substantially suppressed. Thus, the remediation ions will be available for the desired exchange with the contaminant.

The naturally-occurring ions added to the remediation solution can be any naturally-occurring anion, cation or a mixture thereof that is typically found in land formations. Preferably, the method of the invention is used to treat formations containing cations selected from the group consisting of calcium, sodium, magnesium, potassium and mixtures thereof, and anions selected from the group consisting of hydroxide, carbonate, bicarbonate, sulfate, chloride and mixtures thereof.

Preferably, the remediation solution contains the naturally-occurring ions that are actually present in the particular site being treated. Preferably, the concentration of these ions in the remediation solution should be at least equal to, or even more preferably, greater than, the concentration of the naturally-occurring ions in natural groundwater in the formation.

Any remediation ion, in the form of a salt, can be added to the remediation solution to target contaminant removal. Preferably, the remediation solution contains at least one remediation ion selected from the group consisting of aluminum, magnesium, calcium, potassium, sodium, hydrogen, chloride, sulfate, carbonate, bicarbonate, hydroxide, or any mixture thereof.

The method of the invention can be applied to any formation containing an unacceptably high level of soluble heavy metal contaminants. Soluble heavy metal contaminants include ionic heavy metals, dissolved heavy metals, and other forms of water soluble heavy metals. Preferably treated by the method of the present invention are heavy metal containing materials containing ionic heavy metals or dissolved heavy metals.

The invention is particularly useful in removing heavy metals including but not limited to uranium, arsenic, cesium, copper, cobalt, lead, iron, strontium, radium, silver, cadmium, mercury, chromium, barium, zinc, thorium and any mixture thereof. It is also particularly effective in targeting the removal of radioactive contaminants.

The present invention may be carried out utilizing any suitable means for introducing the remediation solution into the formation, including but not limited to injection methods. For example, injection systems as defined by any suitable arrangement of wells may be used. The injection wells can be arranged in any convenient pattern such as the conventional five spot pattern wherein a central well is surrounded by four somewhat symmetrically located injection wells. Alternatively, other suitable patterns include line drive, staggered line drive, four spot, seven spot, and others.

The remediation solution may be introduced by injecting, for example, one pore volume of remediation solution into the formation. The solution may be recovered immediately after it has passed through the contaminated zone. Alternately, the solution can be allowed to sit and react, and after a period of time has passed, the solution is subsequently recovered after it has passed through the contaminated zone. The level of contaminants in the formation is monitored by analyzing the recovered solution for the presence of the heavy metals.

The determination of the attainment of environmentally acceptable levels of contaminants may be prehydroxide, formed by any suitable analytical procedure, such as atomic absorption spectroscopy, emissions spectroscopy and the like.

The steps of injecting the remediation solution, followed by subsequent recovery of the solution, can be repeated continuously until the level of heavy metal contamination in the formation has been sufficiently reduced.

Thus, the method of the invention quickly and efficiently removes all solubilized (or readily soluble) contamination from the formation. Accordingly, by treating formations using the methods described herein, contaminant levels can be reduced to environmentally acceptable values, such as, for example, less than about 2,000 ppm, preferably less than about 100 ppm, more preferably less than about 10 ppm, and even more preferably less than about 1 ppm.

Although treatment of the formation can stop at this point, another aspect of the invention can be applied to reduce contamination levels even further by stabilizing those contaminants which are not readily removed with a reasonable volume of the remediation solution.

In this aspect of the invention, an aqueous stabilization solution containing a stabilizing amount of silicate ions is introduced into the formation to treat any remaining contamination that could eventually mobilize into the groundwater. Any heavy metal contaminants that remain in the formation, when subjected to silicate ions in the stabilization solution, will form coprecipitates which are substantially insoluble in formation fluids. Being insoluble, the coprecipitates drop out of solution and deposit onto the soil, thereby substantially removing the heavy metals from solution. In addition, the coprecipitation reaction substantially stabilizes the heavy metal contaminants—that is, it inhibits further remobilization, elution and leaching of the contaminants by groundwater.

"Coprecipitation" as used with respect to the invention described herein refers to the chemical phenomenon where, within an aqueous solution containing a cationic precipitate precursor, an anionic precipitate precursor, and one or more coprecipitant precursors, the cationic and anionic precipitate precursors are caused to chemically react and precipitate out of the aqueous solution as precipitate particles; and, as the precipitate particles are formed, coprecipitant precursors are removed from the aqueous solution by adsorption onto the surface of the precipitate and/or by occlusion within the interior of the precipitate. The term "occlusion" as used herein refers to the entrapment of foreign ions within a precipitate by physical encapsulation within the precipitate walls and/or by chemical bonding within the precipitate structure.

In the method of the invention, the cationic precipitate precursor (any cation, including, but not limited to, hydrogen and heavy metal cations) is caused to react with the anionic precipitate precursor (silicate ions) and precipitate out of solution. As the precipitate forms, substantial quantities of coprecipitant precursors (heavy metal ions) coprecipitate with the precipitate and are thereby removed from solution.

Although any cationic and anionic precipitate precursors may be used which are effective at stabilizing any remaining contamination, in practicing the method of the invention it is preferred that the stabilization solution comprise silicate ions. It is even more preferred that the stabilization solution consist essentially of an aqueous solution of sodium silicate, potassium silicate, or a mixture thereof. The preferred silicate salts are readily water soluble and they can be applied to the environment safely and without harmful effect. In addition, these salts are particularly effective at removing heavy metal contaminants from ground water. Indeed, using these salts it is possible to reduce the level of heavy metals contamination to as low as several parts per billion.

In order to attain this level of heavy metal stabilization, it is preferred that in practicing the invention the stabilization solution is introduced into the formation as an aqueous solution having a desirably high concentration of silicate ions. For example, in practicing the method of the invention, an aqueous solution of sodium (or potassium) silicate containing at least about 0.1 to about 100 gm/liter of sodium (or potassium) silicate may be introduced into the formation. Preferably, the aqueous solution should contain about 1 to about 50 gm/liter, and even more preferably about 1 to about 10 gm/liter. The term "aqueous solution" as used herein is meant to include solutions in which the solvent is typically water and optionally, water-miscible liquids.

Therefore, in practicing the invention, a substantial amount of silicate, in a highly soluble form, is introduced into a formation. The concentration of silicate in the formation is typically much greater than the concentration of heavy metal contaminants. Thus, the silicate ions readily react with the cations, including heavy metal cations, thereby precipitating out of solution. In addition, as the precipitates form, substantial quantities of heavy metal ions are occluded within or adsorbed onto the silica or silicate precipitate and are removed from solution.

The coprecipitation reaction is very rapid. Typically, more than about 95 weight %, and usually more that about 99 weight %, of the heavy metals remaining in introduction of the solution into the formation. After this period, the remaining solubilized heavy metals continue to be adsorbed onto or occluded within the coprecipitate particles. Typically, the coprecipitation reaction will be substantially complete in about 60 minutes.

The stabilization solution can be introduced into the formation utilizing any suitable means, including any means used to introduce the remediation solution into the formation. For example, injection wells may be used.

The stabilization solution can be introduced into the formation by injecting one pore volume of solution into the formation. The solution is then allowed to sit and react. After a period of time has passed, clean water subsequently is injected and recovered after it has passed through the contaminated zone. The level of contaminants in the formation is monitored by analyzing the recovered water solution for the presence of the heavy metals.

Introduction of the stabilization solution may cease when the recovered solution contains acceptable levels of contamination. By using the methods of the invention, the level of contamination may be typically reduced to less than about 1 ppm, preferably less than about 0.1 ppm, even more preferably less than about 100 ppb, and most preferably less than about 10 ppb.

However, in order to ensure that stabilization of the contaminants in the treated area is substantially complete, it has been determined that it is preferable to continue to apply the method even after environmentally acceptable contamination levels are initially attained. This will ensure that an environmentally acceptable level of contaminant will be maintained for a prolonged period following treatment. For example, environmentally acceptable levels of contamination can be attained by the present method of the invention four pore volumes after beginning treatment and restoration.

The remediation and stabilization solutions may be introduced into the formation simultaneously (i.e., concurrently), or consecutively. In a preferred embodiment for carrying out the method of the invention, the remediation solution is introduced into the formation first, followed by recovery of the solution. These two steps are repeated until all readily soluble contamination has been removed and analysis of the recovered solution indicates that the level of contamination has been substantially reduced or is at an acceptable level. Then the stabilization solution can be introduced.

Alternatively, the remediation and stabilization solutions can be introduced concurrently. In applying this embodiment of the invention, the level of cation in the stabilization solution must be increased in order to facilitate the mobilization of the heavy metal contaminants from the soil. As the heavy metals are solubilized, they will coprecipitate with the silicates in solution.

This in-situ restoration method can be applied to any number of contaminated sites, including for example, radioactive waste or chemical waste burial sites. It is very cost effective and technically superior to other in-situ methods presently available.

The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A method for in-situ mobilization and stabilization of soluble heavy metal contaminants in soil and groundwater comprising the steps of:
   a. first introducing into said soil an aqueous remediation solution comprising remediation ions and naturally-occurring ions present in said soil, said solution selectively solubilizing and mobilizing said contaminants into solution while substantially suppressing the displacement of naturally-occurring ions from said soil;
   b. then recovering said aqueous solution from said soil;
   c. then repeating steps (a) and (b) until the concentration of said heavy metal contaminants in said recovered solution is less than about 2,000 ppm;
   d. then introducing into said soil an aqueous stabilization solution consisting essentially of sodium silicate, potassium silicate, or a mixture thereof, said stabilization solution containing at least about 0.1 to about 100 gm/liter of sodium or potassium silicate;

whereby the remainder of said contaminants when subjected to silicate ions form coprecipitates which are substantially insoluble in groundwater, thereby stabilizing said contaminants and inhibiting their remobilization by groundwater.

2. The method of claim 1 wherein said remediation solution comprises naturally-occurring ions at a concentration at least about equal to the concentration of said ions in natural ground water in said soil.

3. The method of claim 2 wherein said remediation solution comprises naturally-occurring ions at a concentration greater than the concentration of said ions in natural ground water in said soil.

4. The method of claim 1 wherein said contaminants are selected from the group consisting of cations, anions and mixtures thereof.

5. The method of claim 1 wherein said contaminants are selected from the group consisting of uranium, cesium, copper, arsenic, cobalt, lead, iron, strontium, radium, silver, cadmium, mercury, chromium, barium, zinc, thorium and mixtures thereof.

6. The method of claim 1 wherein said soil contains naturally-occurring cations selected from the group consisting of calcium, sodium, magnesium, potassium, and mixtures thereof.

7. The method of claim 1 wherein said soil contains naturally-occurring anions selected from the group consisting of hydroxide, carbonate, bicarbonate, sulfate, chloride and mixtures thereof.

8. The method of claim 1 wherein said remediation ions are cations selected from the group consisting of aluminum, magnesium, calcium, potassium, sodium, hydrogen, and mixtures thereof.

9. The method of claim 1 wherein said remediation ions are anions selected from the group consisting of chloride, sulfate, carbonate, bicarbonate, hydroxide, and mixtures thereof.

10. The method of claim 1 wherein said solutions are introduced into said soil by injection.

* * * * *